(12) United States Patent
Martin Vidal et al.

(10) Patent No.: US 11,872,763 B2
(45) Date of Patent: Jan. 16, 2024

(54) SUPPLYING MATERIAL TO AN ADDITIVE MANUFACTURING PLATFORM (71) Applicant: HEWLETT-PACKARD DEVELOPMENT COMPANY, L.P., Spring, TX (US)

(72) Inventors: Pau Martin Vidal, Sant Cugat del Valles (ES); Fernando Juan Jover, Sant Cugat del Valles (ES); Gerard Mosquera Donate, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,778

(22) PCT Filed: Jul. 12, 2018

(86) PCT No.: PCT/US2018/041868
§ 371 (c)(1),
(2) Date: Oct. 24, 2019

(87) PCT Pub. No.: WO2020/013828
PCT Pub. Date: Jan. 16, 2020

(65) Prior Publication Data
US 2021/0354385 A1    Nov. 18, 2021

(51) Int. Cl.
*B29C 64/321*    (2017.01)
*B29C 64/40*    (2017.01)
(Continued)

(52) U.S. Cl.
CPC ............ *B29C 64/321* (2017.08); *B33Y 10/00* (2014.12); *B33Y 30/00* (2014.12); *B33Y 40/00* (2014.12)

(58) Field of Classification Search
CPC ... B29C 64/321; B29C 64/153; B29C 64/241; B29C 64/343; B33Y 10/00; B33Y 30/00; B33Y 40/00
See application file for complete search history.

(56) References Cited

U.S. PATENT DOCUMENTS

2001/0045678 A1    11/2001    Kubo et al.
2007/0298182 A1*   12/2007    Perret ..................... B22F 10/70
                                                              427/427.3
(Continued)

FOREIGN PATENT DOCUMENTS

CN    105010708 A    11/2015
CN    204957690 U    1/2016
(Continued)

OTHER PUBLICATIONS

Sheryshev, M.A., et al., "Manufacturing Profiled Pvc Products", Scientific Basics of Technology, 2015, pp. 1-6.

*Primary Examiner* — Joseph S Del Sole
*Assistant Examiner* — Baileigh Kate Darnell
(74) *Attorney, Agent, or Firm* — SHOOK, HARDY & BACON L.L.P.

(57) ABSTRACT

In one example, an apparatus for supplying material to an additive manufacturing platform comprises a rotatable delivery module comprising a vane; and a plurality of distribution elements. In use, the rotatable delivery module is controllable to rotate the vane to a supply position to enable material to be supplied to an additive manufacturing platform from the vane. The vane and the plurality of distribution elements are arranged such that during the rotation: the vane provides a dose amount of material from a material supply module for supply to an additive manufacturing platform and at least one of the plurality of distribution elements distributes material within the material supply module so that the vane supplies a substantially (Continued)

uniform dose of material along the length of the vane to the additive manufacturing platform.

19 Claims, 12 Drawing Sheets

(51) Int. Cl.
*B33Y 30/00* (2015.01)
*B33Y 40/00* (2020.01)
*B33Y 10/00* (2015.01)

(56) References Cited

U.S. PATENT DOCUMENTS

| | | | |
|---|---|---|---|
| 2015/0224712 A1* | 8/2015 | Tjellesen | ................ B29C 64/40 |
| | | | 425/375 |
| 2017/0072636 A1 | 3/2017 | Ng et al. | |
| 2017/0106570 A1* | 4/2017 | Karlsson | ................ B33Y 10/00 |
| 2018/0311731 A1* | 11/2018 | Spicer | ................... B29C 64/241 |

FOREIGN PATENT DOCUMENTS

| | | |
|---|---|---|
| CN | 206088160 U | 4/2017 |
| CN | 107530970 A | 1/2018 |
| CN | 107848200 A | 3/2018 |
| WO | WO2016068899 A1 | 5/2016 |
| WO | WO-2017005301 A1 | 1/2017 |
| WO | WO2017088897 A1 | 6/2017 |
| WO | WO-2017088897 A1 | 6/2017 |
| WO | WO2017196326 A1 | 11/2017 |
| WO | WO2017196352 A1 | 11/2017 |

\* cited by examiner

SUPPLYING MATERIAL TO AN ADDITIVE MANUFACTURING PLATFORM

BACKGROUND

Certain printing systems make use of a powdered material during a printing process. For example, an additive manufacturing system, such as a three-dimensional (3D) printing system, may use a powder container to store a powdered build material. In such a scenario, the powdered material is conveyed from the powder container to the printing system to allow printing. The powdered build material may be used to form a three-dimensional object, such as by fusing particles of build material in layers, whereby the object is generated on a layer-by-layer basis.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Three-dimensional objects can be generated using additive manufacturing techniques. The objects may be generated by solidifying portions of successive layers of build material. The build material can be powder-based, and the material properties of generated objects may be dependent on the type of build material and the nature of the solidification process. In some examples, solidification of the powder material is enabled using a liquid fusing agent. In other examples, solidification may be enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and solidify. In other examples, other build materials and other methods of solidification may be used. In certain examples, the build material includes paste material, slurry material or liquid material.

Examples of build materials for additive manufacturing include polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide (e.g., nylon), thermo (setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, and plastics/ceramics blends. There exist more build materials and blends of build materials that can be managed by an apparatus of this disclosure and that are not mentioned in this disclosure.

In example 3D printing systems that use powdered material, the powdered material may be conveyed from a powder storage unit to a dosing system and then to a printing platform, located next to the dosing system, and on which a printed part is built layer by layer. An example dosing system provides a dose amount of powder, which is an amount of powder sufficient to form a layer on the printing platform, for application to a printing platform. In example three-dimensional printing systems, powder may be applied to a printing platform using a lifting platform with a spreading mechanism that spreads material on to a printing platform from the lifting platform. The lifting platform continuously lifts powder into the path of the spreading mechanism as the printing platform moves down. An example spreading mechanism may be a roller that moves across a printing platform in a first direction to deposit a first layer of powder from a dosing system on one side of the platform and then moves in a second, opposite, direction to deposit another layer of powder from a second dosing system on the other side of the platform. In another example, powder may be applied to a printing platform using gravity.

In some three-dimensional printing systems, a dosing system may have a feeder tray to which powder is provided via an input in the feeder tray from a powder storage unit. The amount of powder in the feeder tray may be measured, for example, by compressing the powder against a flat surface. The measurement of powder through compression enables the determination of an amount of powder to be supplied so that a printing layer may be applied to the printing platform. The supply of powder to the feeder tray can then be controlled accordingly. However, measuring powder in this way can be inaccurate which may lead to reduced part quality.

In addition, some three-dimensional printing systems may use an additional mechanism to distribute powder in a feeder tray of a dosing system. One example of a distribution mechanism is a mesh shaker that moves back and forth to convey powder from an input in the feeder tray out to the edges of the feeder tray. However, such a distribution mechanism may increase the complexity of operating a three-dimensional printing system.

Accordingly, to avoid these issues, an example apparatus for supplying material to an additive manufacturing platform, such as a three-dimensional printing platform, as described herein provides a way of providing an accurate dose amount of material for application to a printing platform at the same time as distributing material within a material container, such as a feeder tray, so that the dose amount of material is a substantially uniform dose of material.

An example apparatus for supplying material to an additive manufacturing platform, for example, a three-dimensional printing platform, comprises a rotatable delivery module comprising: a vane; and a plurality of distribution elements; wherein the rotatable delivery module is controllable to rotate the vane to a feed position to enable material to be supplied to a printing platform from the vane, wherein the vane and the plurality of distribution elements are arranged such that during the rotation: the vane provides a dose amount of material from a material supply module for supply to a printing platform; and at least one of the plurality of distribution elements distributes material within the material supply module so that the vane supplies a substantially uniform dose of material along the length of the vane to the printing platform.

The material supply module may also be referred to as a feeder tray.

The substantially uniform nature of the dose of material may be defined in relation to characteristics of at least one cross section of the dose of material along one or more of the following: the length of the dose of material; the length of the vane; and the width of the printing platform, where one or more of the following characteristics of the dose of material may be considered: density; mass; volume; width, where the width of the material extends in a direction perpendicular to the longitudinal axis of the vane; height; particle size distribution; and average temperature. As an example, the dose of material may be a substantially uniform dose of material if the dose of material has a substantially uniform density along the width of the printing platform. As another example, the dose of material may be a substantially uniform dose when each cross section of the dose along the length of the vane has substantially the same: particle size distribution, average temperature, and amount of material, where the amount of material is defined by at least one of: mass, density and volume of material.

The example printing apparatus provides a single mechanism that conveys material from an input of a material supply module to a uniform, linear, output on a vane for supplying to a printing platform. In addition, the example apparatus described herein reduces the number of active parts because the single mechanism has dosing and distributing functions, both of which are carried out during rotation of the single mechanism. As such, the example printing apparatus is a simplified design and is compatible with a continuous feeding strategy, whereby material is continually input into the material supply module, and the example printing apparatus can produce a dose of powder in a reduced time, increasing productivity. In addition, the simplified design reduces the number of failure modes, improving reliability and up time of the printing apparatus and overall system.

In addition, the example apparatus does not generate artefacts in the powder and is not reliant on compression of powder for controlling powder input, and thus provides a more accurate dose of powder, thereby increasing the quality of a printed part.

Furthermore, the herein described example apparatus avoids the need for complex linear sealing systems previously used in conjunction with a mesh shaker distribution element. The herein described example apparatus also maintains performance levels when scaled up.

Figure 1:
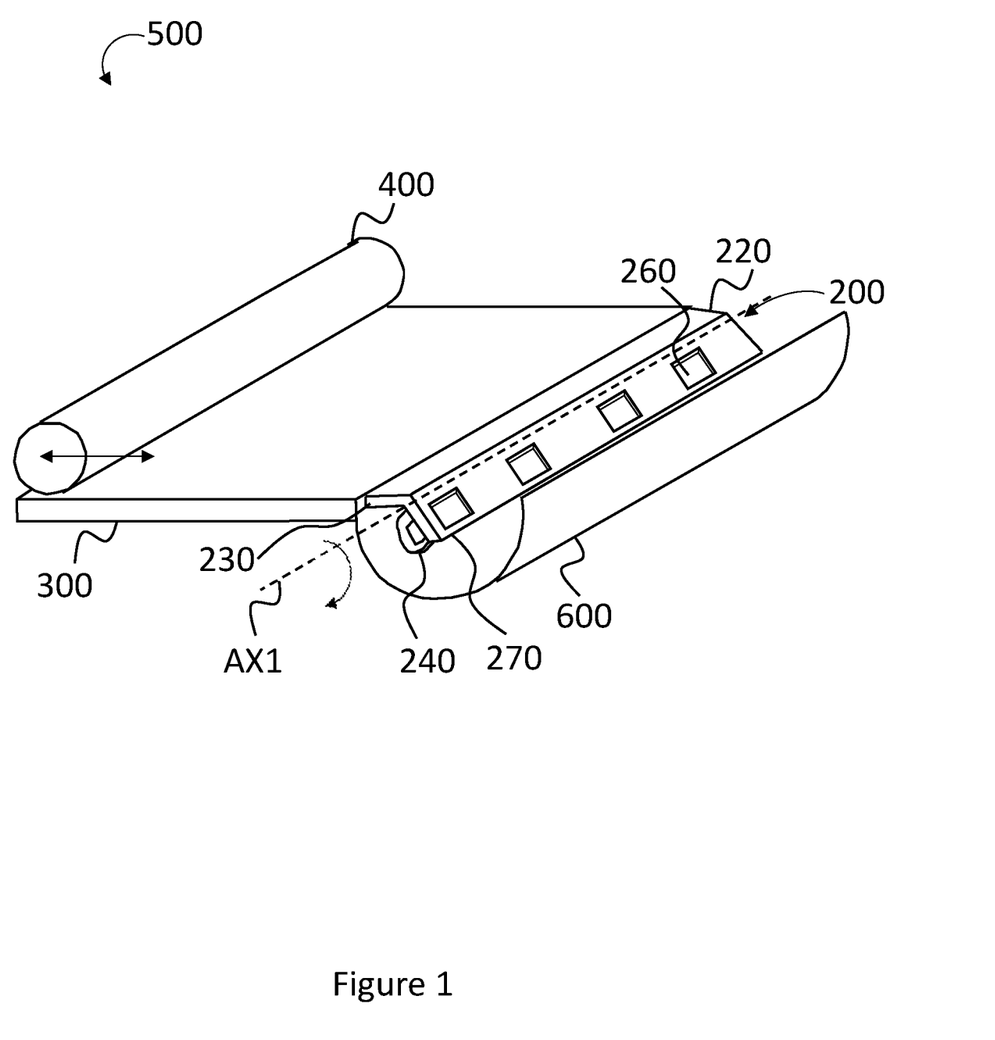
FIG. 1 is a schematic perspective view of a material feeding system of a three-dimensional printing system, according to an example.

FIG. 1 shows a perspective view of an example material feeding system 500 of a 3D printing system. The material feeding system 500 has an apparatus 200 for suppling material to a building area, such as an additive manufacturing platform in the form of a three-dimensional printing platform 300, on which a part may be built by an additive manufacturing process.

The apparatus 200 is positioned within a material supply module 600 located adjacent the 3D printing platform 300.

The material supply module 600 is a material deposit, such as a feeder tray, into which material is supplied and out of which material is fed or supplied to an additive manufacturing platform, such as platform 300. The feeding of the material to the platform 300 is carried out by a feeder apparatus, such as apparatus 200, controllable by a controller (not shown).

In more detail, the material supply module 600 holds material for building a part. The material supply module 600 has an input (not shown) that receives the material for building a part. The input is located on a bottom surface of the material supply module 600 and may be positioned in the center of the bottom surface.

A dose amount of the material is provided from the material supply module 600 by the apparatus 200 so that a layer of material can be formed on the printing platform 300. In one example, a dose amount of material may be one of the following: 6 grams, 8 grams, 10 grams, 12 grams, 14 grams, and 16 grams. The dose amount of material is an amount that is at least enough to form a layer of material on the platform 300 and may be a predetermined amount of material.

As each dose is applied to the printing platform, the material supply module 600 receives additional material through the input so that the material level within the module 600 is maintained at a steady state. In another example, the material within the module 600 may be maintained within one or more predetermined levels.

The material feeding system 500 also has an element 400 that transfers the dose amount of material from the apparatus 200 to the printing platform 300. The element 400 is depicted as cylindrical roller but in an alternative example may be a blade or a sliding carriage holding an appropriate transferring element.

The apparatus 200 has a rotatable delivery module 220 that rotates in a clockwise direction about a longitudinal axis, AX1, depicted by the dotted line. The rotation of the rotatable delivery module 220 is controlled by a driver circuitry (not shown), where the driver circuitry effects rotation in response to a control signal from a controller (not shown), such as a microprocessor, forming part of processing circuitry of the apparatus 200 or the material feeding system 500. As an example, the driver circuitry may include a motor or pulley-belt system that controls the rotation.

The rotatable delivery module 220 has a vane 230 and a distribution portion 270. The vane 230 and the distribution portion 270 each have a longitudinal axis (not shown) and are arranged adjacent to one another such that the longitudinal axis of the vane 230 is parallel to that of the distribution portion 270. In this example, both the vane 230 and the distribution portion 270 are planar structures, joined together along a single edge. In another example, the vane 230 and the distribution portion 270 may be formed as a single element. The relative arrangement of the vane 230 and the distribution portion 270 is discussed in more detail in relation to FIG. 3.

The vane 230 is a substrate that has a plurality of openings 260 arranged along its length. The openings 260 are discussed in more detail in relation to FIG. 5.

Referring again to FIG. 1, the distribution portion 270 of the rotatable delivery module 220 has a plurality of distribution elements 240 arranged thereon. As the rotatable delivery module 220 rotates in a clockwise direction, both the vane 230 and at least one of the plurality of distribution elements 240 collect material, held by the material supply module 600, to provide a dose amount of material to be transferred to the platform 300 by the element 400 and to distribute material away from the input of the material supply module 600 along the length of the material supply module 600, respectively. The vane 230 is a feeder substrate that collects material for supply to the platform 300.

The clockwise direction of rotation means that the vane 230 collects the material before the at least one of the plurality of distribution elements 240.

The at least one of the plurality of distribution elements 240 is geometrically designed to distribute material based on the working principle of an Archimedes screw. In more detail, each of the plurality of distribution elements 240 has a shape chosen to obtain a desired effect on powder motion within the material supply module 600. As such, each distribution element can be considered to be a transportation feature. The Archimedes working principle means that as the rotatable delivery module 220 rotates to perform a partial or full rotation, material is continuously transported and, thus, distributed, along the length of the material supply module 600. In one example, each distribution element 240 may have a length between 20-50 mm. In one example, the rotatable delivery module 220 completes a plurality of successive complete revolutions to continuously distribute and supply the material.

The plurality of distribution elements 240 are spaced evenly along the length of the distribution portion 270 to provide uniform distribution of material along the full length of the material supply module 600. In one example, the plurality of distribution elements 240 may comprise ten or more elements. Where the distribution elements form part of a helical shape, the pitch of the helix will determine the number of elements in the plurality of distribution elements 240.

The material supply module 600 has a semi-circular cross section in the plane perpendicular to the length of the material supply module 600. Within the same plane, both the vane 230 and the distribution portion 270 have a cross sectional width that allows the rotatable delivery module 220 to rotate within the semi-circular cross section of the material supply module 600, whilst avoiding build-up of stagnant material in cavities or hotspots, reducing artefacts in the material.

Figure 2:
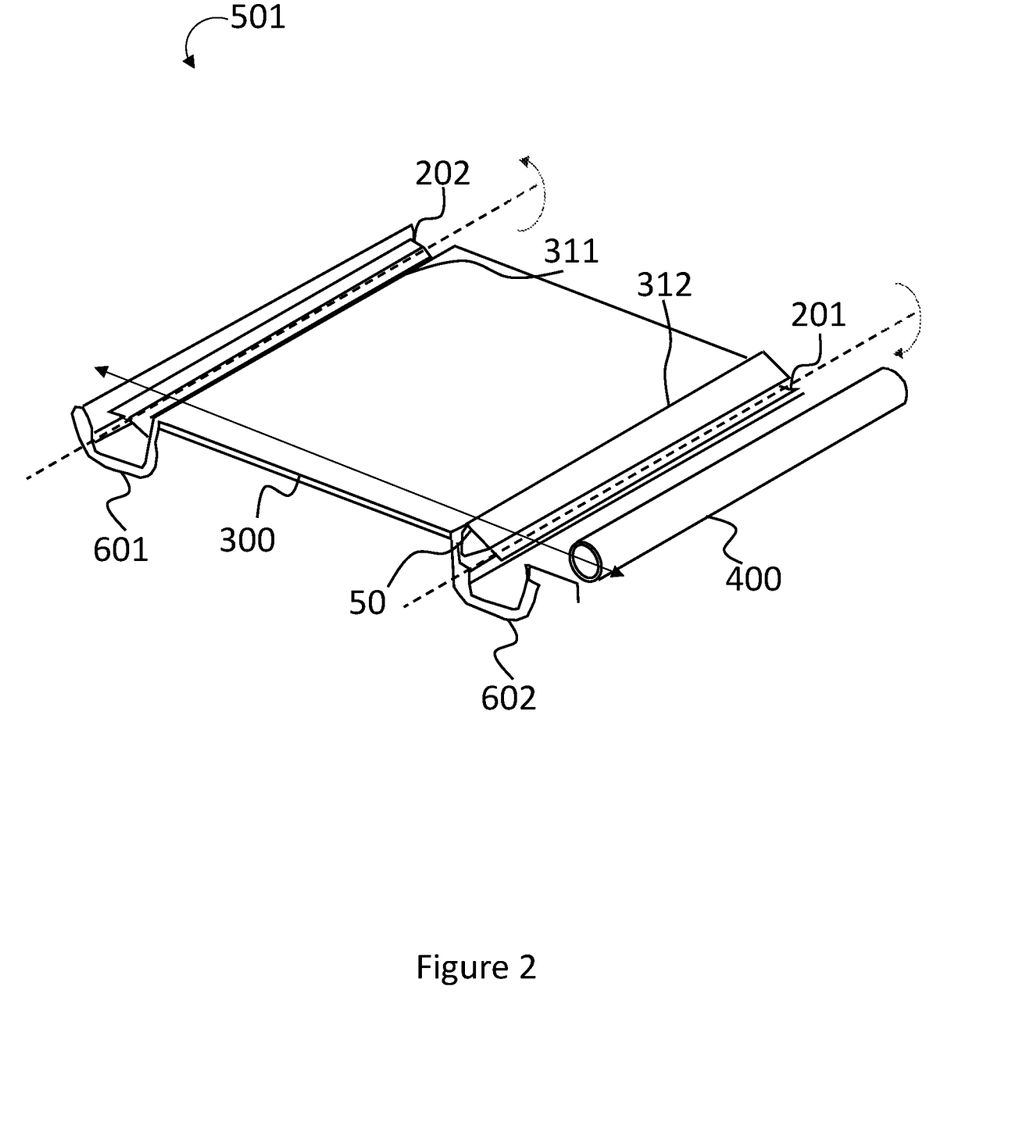
FIG. 2 is a perspective view of a material feeding system of a three-dimensional printing system, according to an example.

FIG. 2 shows another example of a material feeding system 501 of a 3D printing system. The system 501 is the same as the system 500 of FIG. 1 but has a first material supply module 601 adjacent a first edge 311 of the printing platform 300 and a second material supply module 602 positioned along a second edge 312 of the printing platform 300, where the first edge 311 is opposite the second edge. The element 400 transfers a dose amount of material, for example, dose 50, to the platform 300 each time it moves from behind one of the material supply modules, across the platform 300, to a position behind the other material supply module.

For system 501, the time to supply a dose amount of material corresponds to the time taken for the element 400 to apply two layers of material to the printing platform 300.

Figure 3:
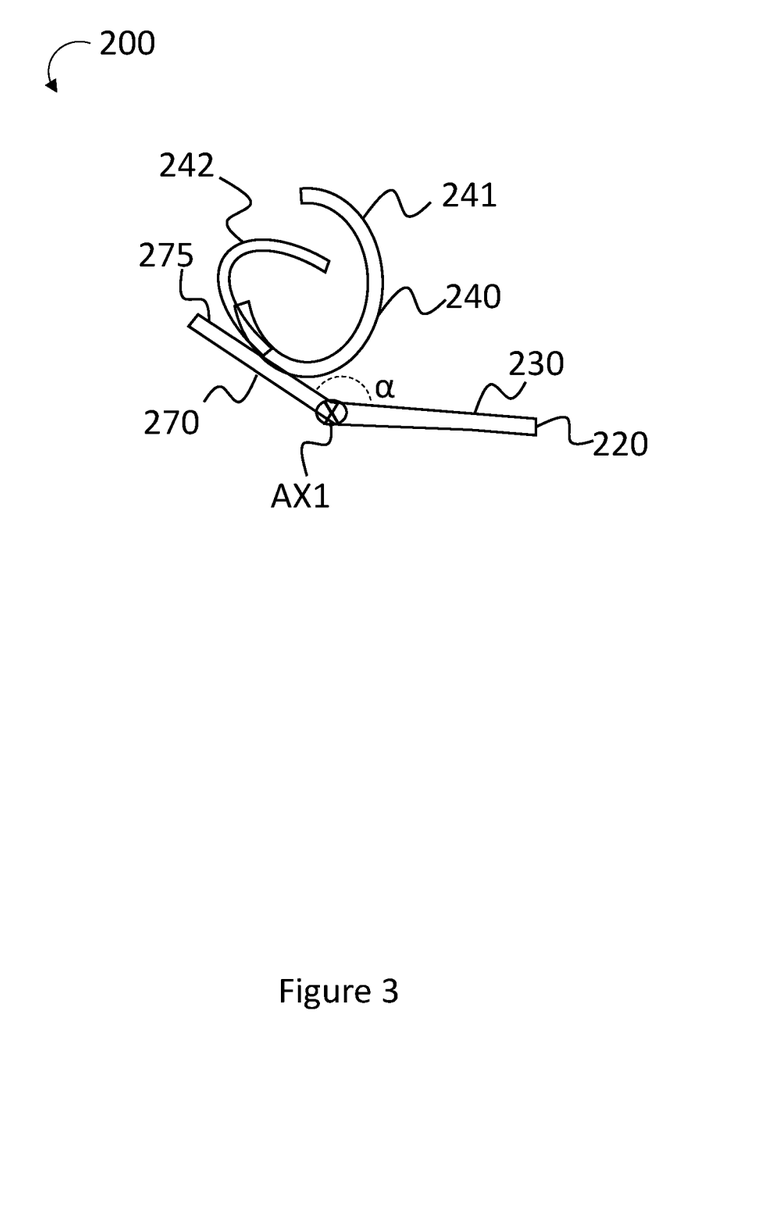
FIG. 3 is a schematic side view of an apparatus for supplying material to a three-dimensional printing system, according to an example.

FIG. 3 is a side view of the apparatus 200 of FIGS. 1 and 2. As described in relation to FIG. 1, the apparatus 200 rotates about a longitudinal axis, AX1. The vane 230 is arranged to extend radially from the point of rotation "X" in a direction perpendicular to the direction of motion of the vane so that the vane 230 collects material as the apparatus 200 rotates. The distribution portion 270 has a first surface 275 on which the plurality of distribution elements 240 are arranged. The distribution portion 270 and the vane 230 are arranged such that the angle between the first surface 275 and the vane 230 is α. In this example, the vane 230 and the distribution portion 270 are formed as an integral structure.

To set a desired speed at which the distribution elements 240 distribute material along the length of the material supply module 600, there are a number of parameters of each of the distribution elements 240 to consider. A desired speed may not be too slow to cause a shortage of material towards the ends of the material supply module 600, nor too fast to cause a shortage of material in the central portion of the material supply module. A speed that is too slow or too fast may result in a failure to complete a full layer on the printing platform.

The parameters relating to speed of distribution include at least: the pitch of a distribution element, an orientation of the distribution element and an inner diameter of the distribution element. The desired speed may be such that shear stresses in the material and friction experienced by the material are reduced. Different geometries of the distribution elements may be selected based on different materials to meet a desired speed.

Referring again to FIG. 3, each of the plurality of distribution elements 240 has a first portion 241 and a second portion 242. The first portion 241 is arranged to distribute material in a longitudinal direction opposite to the second portion 242. In one example, the first portion 241 is arranged to move material away from an input of the material supply module 600. The distribution directions of the first and second portions 241, 242 result from the shape of the portions: the first portion 241 is shaped as a section of a first helical shape extending in a first handed direction and the second portion 242 is shaped as a section of a second helical shape extending in a second handed direction, where the first handed direction is opposite to the second handed direction. As an example, the first helical shape may be a right-handed helical shape and the second helical shape may be a left-handed helical shape.

The first portion 241 has a larger pitch than the second portion 242. In this way the first portion 241 will distribute a greater amount of material in the first direction than the second portion 242 distributes in the second direction. The pitch of each of the first portion 241 and the second portion 242 may be such that a desired amount of material is distributed by each of the first portion and the second portion.

In addition, the first portion 241 has a larger radius than the second portion 242. As a result, the second portion 242 causes material to be distributed in the material supply module 600 when there is a greater amount of material in the material supply module 600 compared to the amount of material in the module 600 when first portion 241 causes material to be distributed. The radius of each of the first portion 241 and the second portion 242 may be such that a desired amount of material is distributed by each of the first portion and the second portion.

In one example, each of the plurality of distribution elements 240, the vane 230, and the distribution portion 270 may be formed from metal, such as sheet metal.

Figure 4:
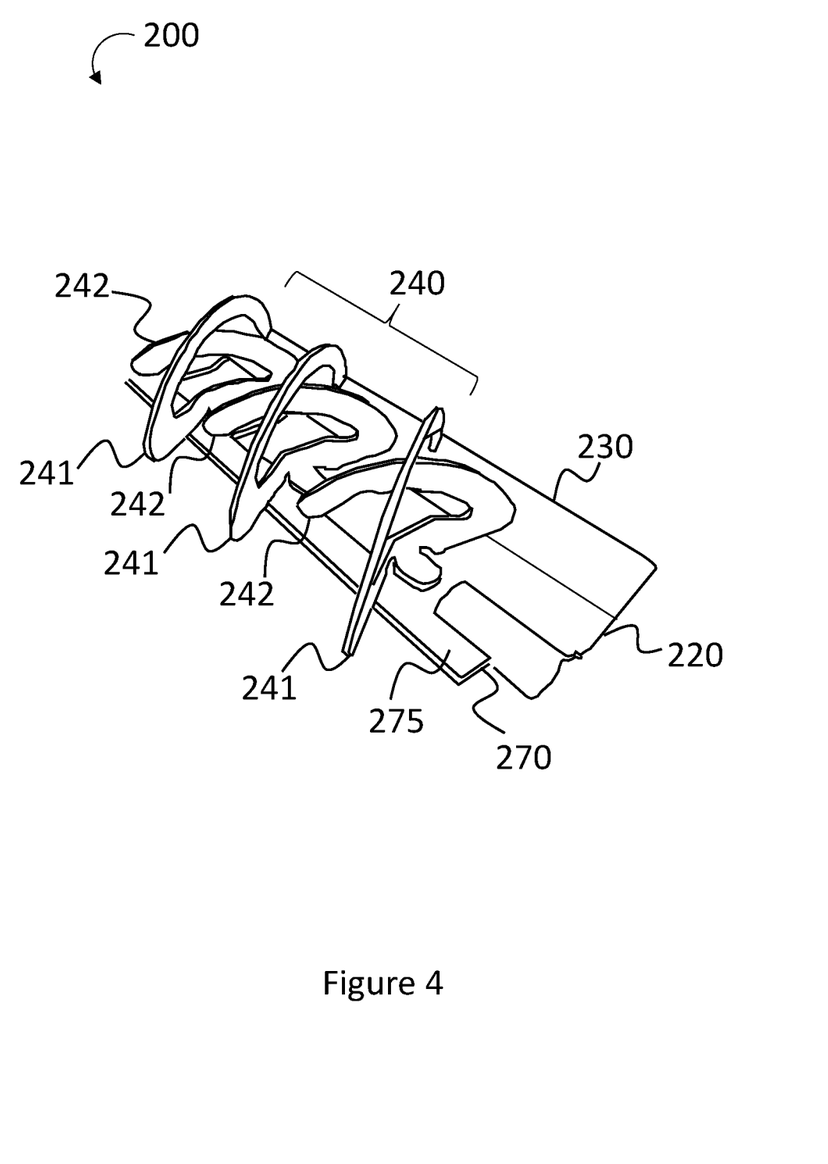
FIG. 4 is a schematic side view of a portion of an apparatus for supplying material to a three-dimensional printing system, according to an example.

FIG. 4 is a perspective view of a portion of the apparatus 200 of FIGS. 1-3. A subset of the plurality of distribution elements 240 of the rotatable delivery module 220 is depicted. Each distribution element of the subset has a first portion 241 defining a first helical shape, where the first helical shape is common to each of the first portions in the subset. In addition, each distribution element of the subset has a second portion 242 defining a second helical shape, in an opposing direction to the first helical shape, where the second helical shape is common to each of the second portions in the subset.

In one example, the subset of FIG. 4 may be arranged on one side of an input to the material supply module 600 and a second subset (not shown) of the plurality of distribution elements 240 may be arranged on an opposite side of the input, wherein the first subset of distribution elements 240 is arranged such that the first portions of the first subset define an opposite handed helical shape to the helical shape defined by the first portions of the second subset of distribution elements 240. In this way, both the first and second subsets of the distribution elements distribute material away from the input along the length of the material supply module 600 as the rotatable delivery module 220 rotates.

Figure 5:
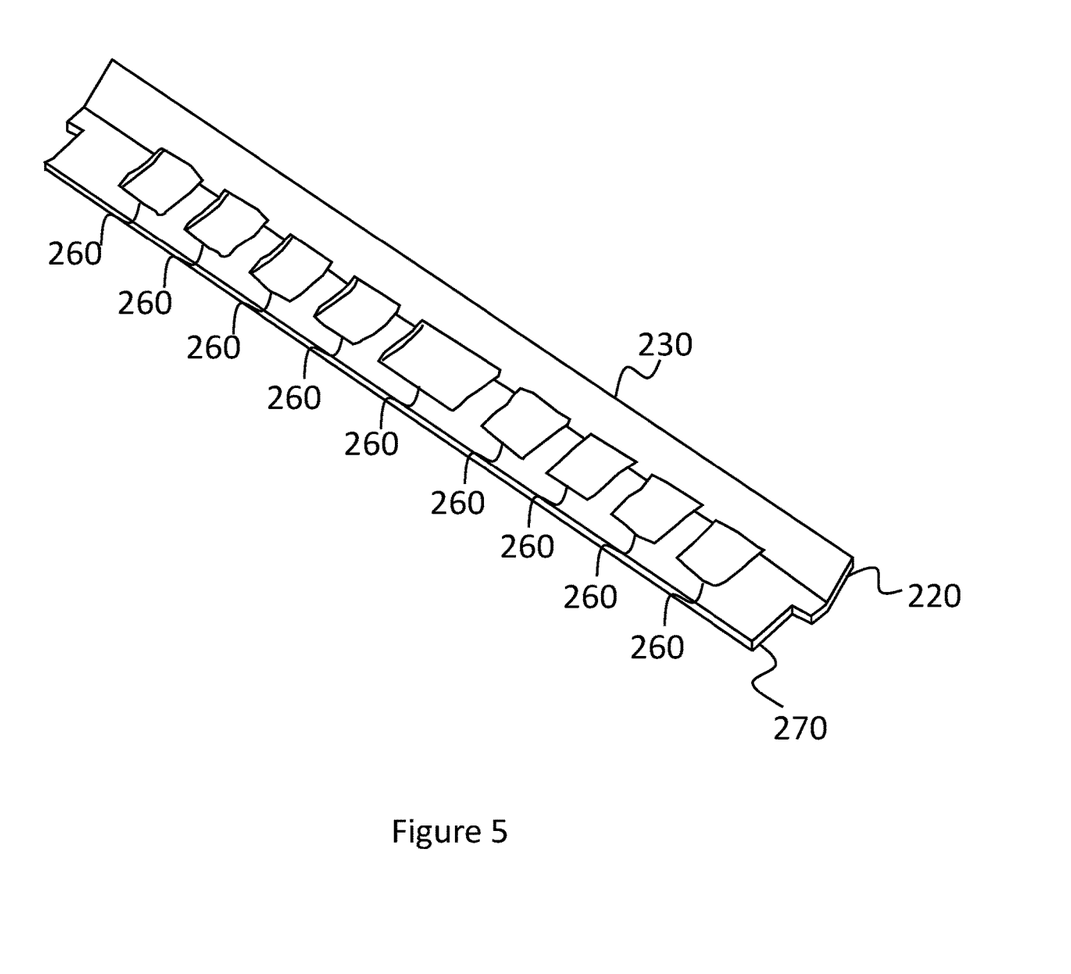
FIG. 5 is a perspective view of an apparatus for supplying material to a three-dimensional printing system, according to an example.

FIG. 5 is a perspective view of the rotatable delivery module 220 without the plurality of distribution elements 240 shown. Like in FIG. 1, in the example of FIG. 5, the rotatable delivery module has a plurality of openings 260 arranged along its length. Each of the plurality of openings 260 is arranged to allow excess material to flow back into the material supply module 600 after the element 400 has moved across the module 600, as described in relation to FIG. 1. Furthermore, the openings 260 in the distribution portion 270 cause the excess material to return to the material supply module at a position that allows the returned material to be collected by either of the vane 230 or at least one of the distribution elements 240. In this way, the openings 260 provide a closed-loop material control and help to maintain a steady state of material in the material supply module 600. The dimensions of the openings 260 may be chosen based on a desired amount of excess material to be returned to the module 600.

FIGS. 6a-6f depict the apparatus 200 at sequential stages in a material supply process.

Figure 6A:
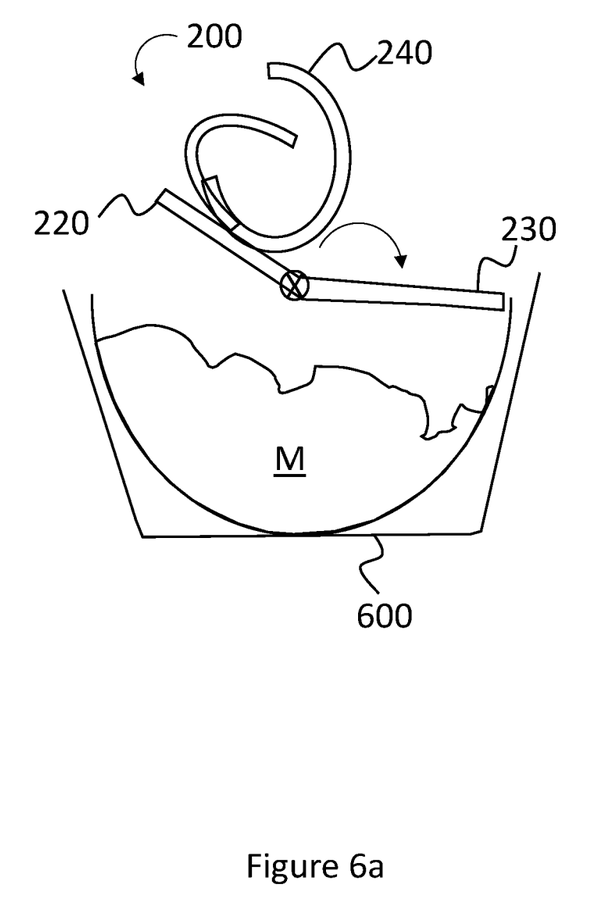
FIGS. 6a to 6f schematically illustrate components of a three-dimensional printing system performing operations to supply material to a printing platform, according to an example.

FIG. 6a shows the apparatus 200 in a starting position, where the rotatable delivery module 220 is not in contact with the material, M, held within the material supply module 600.

Figure 6B:
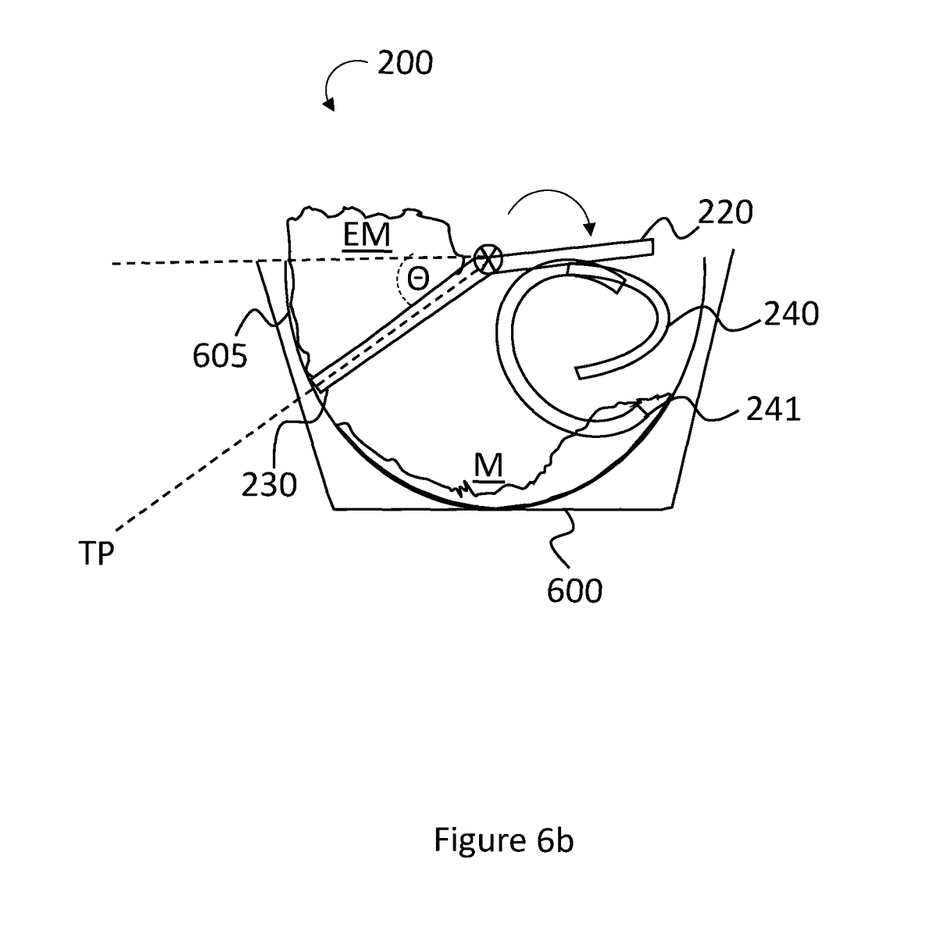

FIG. 6b shows the apparatus 200 in a trimming position, TP, after the rotatable delivery module 220 has rotated in a clockwise direction from the starting position of FIG. 6a.

As the rotatable delivery module 220 moves to the depicted trimming position, TP, the vane 230 sweeps through most of the material within the module 600 and collects a portion of the material M held by the material supply module 600. In so doing, the vane 230 lifts a portion of the material M. In addition, as the rotatable delivery module 220 moves to the trimming position, TP, at least one of the plurality of distribution elements 240 collects another portion of material form the remaining material in the material supply module 600, after the vane 230 has swept through the material M, to distribute the other portion of material within the material supply module 600. In the example of FIG. 6b, a single distribution element 240 is depicted and the first portion 241 of the distribution element 240 collects the material M held by the material supply module 600.

The plurality of distribution elements 240 enable a uniform distribution of the material M along the length of the material supply module 600. In this way, the material supported by the vane 230 is evenly distributed along the length of the vane 230.

Figure 6C:
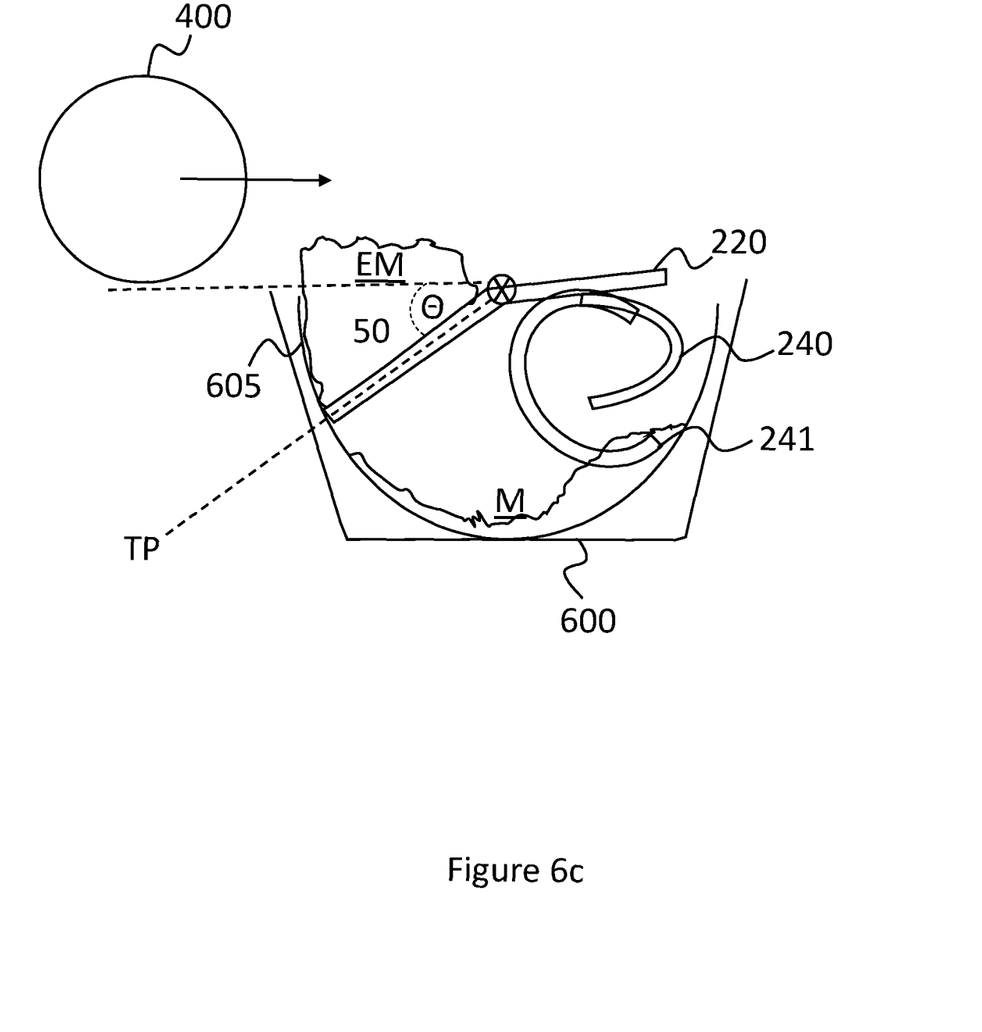

As depicted by FIG. 6c, the trimming position is a position in which the element 400 of FIGS. 1 and 2 may trim the portion of material supported by the vane 230 to remove excess material and leave a dose amount of material on the vane 230 by moving across the material supply module 600.

The trimming position is a position in which the vane 230 is angled away from the horizontal at an angle θ such that the vane 230 and an inner surface 605 of the material supply module 600 define a volume equivalent to a dose amount 50 of the material M. The trimming position may be modified to change the dose amount 50 by changing angle θ.

The rotation of the rotatable delivery module 220 is paused at the trimming position TP to allow the element 400 to remove excess material from the vane 230.

In FIGS. 6b and 6c, the excess material to be trimmed is above the horizontal dashed line and labelled EM.

Figure 6D:
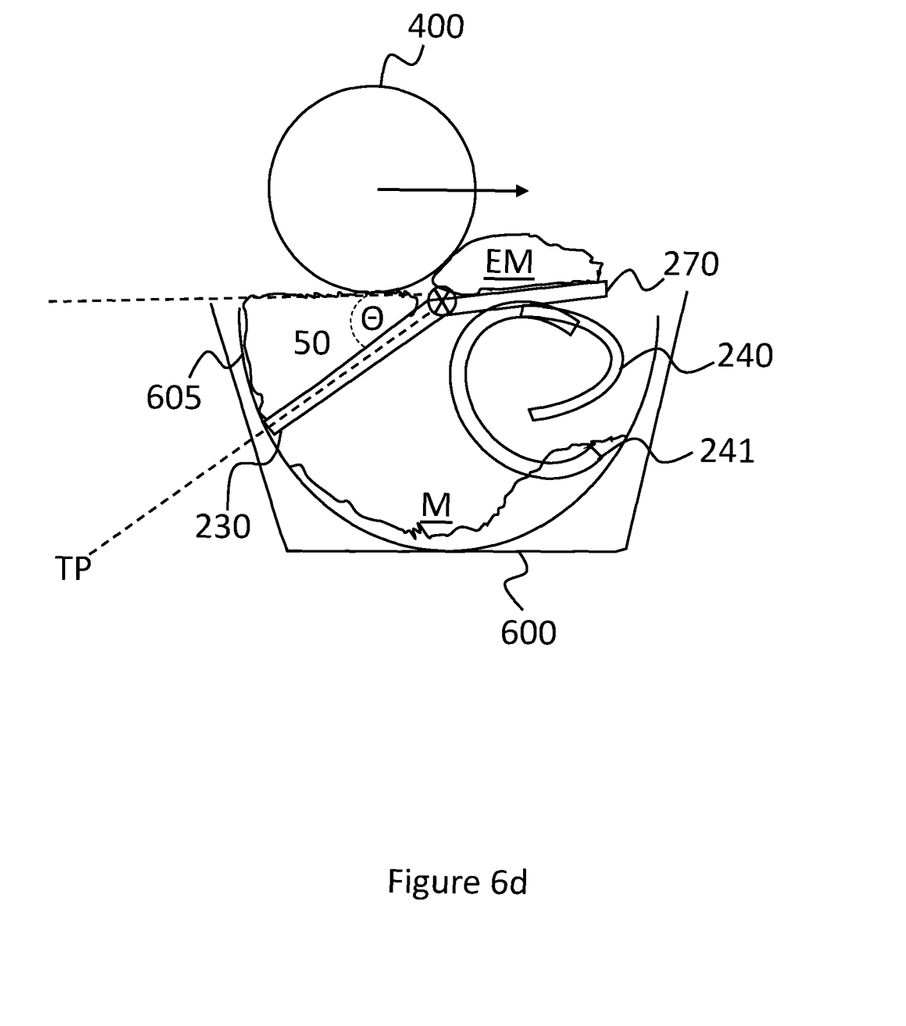

FIG. 6d shows the excess material, EM, being moved across to the distribution portion 270 from the vane 230 by the element 400 so that the excess material, EM, falls through at least one of the plurality of openings 260 (FIG. 5) on the distribution portion 270 back into the material supply module 600

Figure 6E:
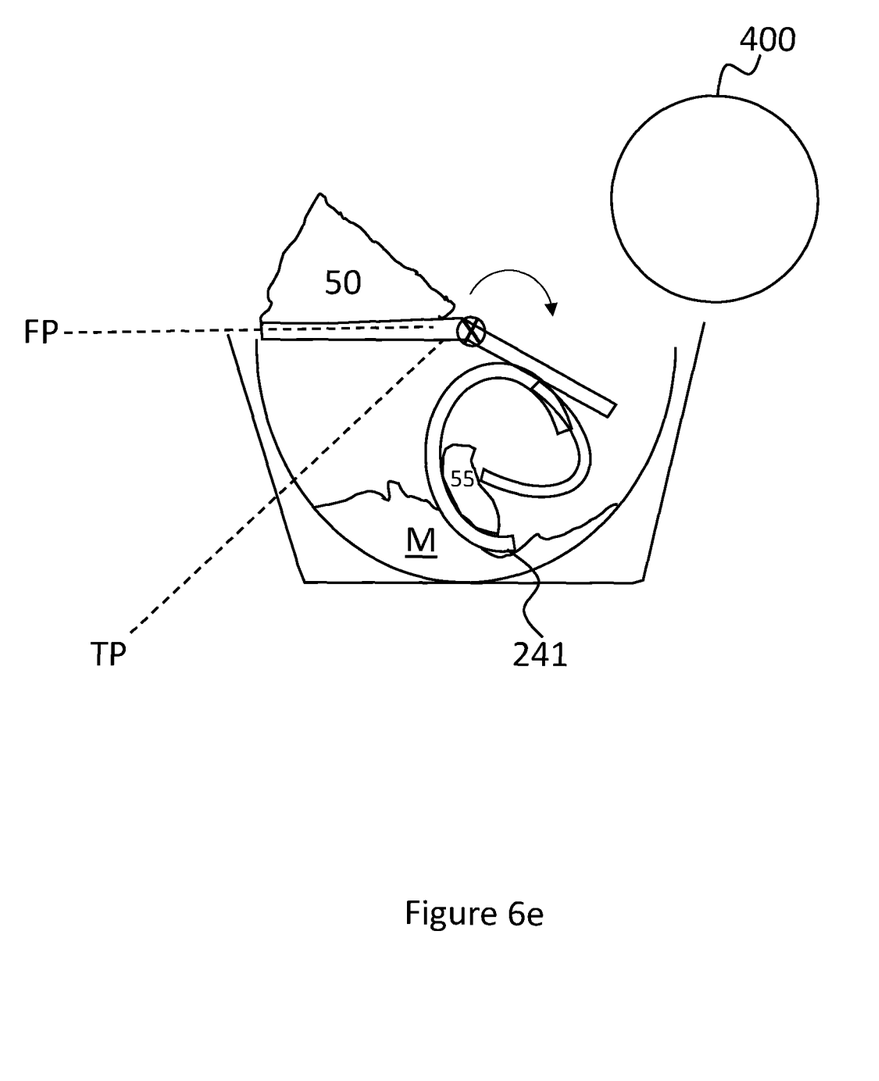
Figure 6F:
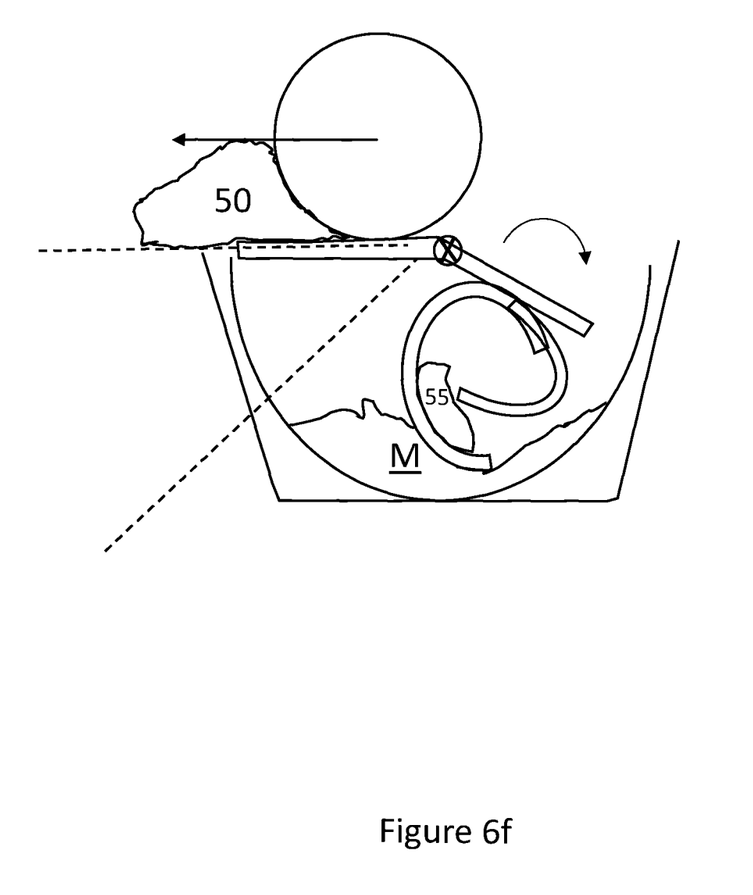

FIG. 6e shows the vane 230 in a feed position, FP, in which the vane 230 is substantially horizontal and holds a dose 50 of material for supply to a printing platform, such as platform 300 of FIGS. 1 and 2, by the element 400. The rotation of the rotatable delivery module 220 is paused at the feed position, FP, to allow the element 400 to move the dose 50 from the vane 230 to a build area, such as a printing platform, as depicted in FIG. 6f.

As the vane 230 moves to in the feed position, FP, the first portion 241 of the distribution element 240 distributes a portion of material, 55, in the material supply module 600 by transporting the portion of material, 55, along at least a part of the length of the material supply module 600.

After application of the dose 50 to the printing platform, the apparatus 200 continues to rotate to a position where neither the vane 230 nor the plurality of distribution elements 240 is in contact with material held by the material supply module 600. The process described in relation to FIGS. 6a-6f may then be repeated to provide a further dose and subsequent layer of material to a printing platform.

In another example, the material held by the material supply module 600 may be such that at least one of the first and second portions 241, 242 of at least one of the distribution elements 240 contacts a portion of the material at an earlier or later stage of the rotation of the apparatus 200 from the starting position to the feed position, FP. As an example, the at least one distribution element 240 may first contact a portion of material as the vane 230 rotates from the trimming position, TP, to the feed position, FP, such that the at least one distribution element 240 collects a portion of material containing at least some of the excess material returned to the module 600 from the vane 230 by the element 400.

Figure 7:
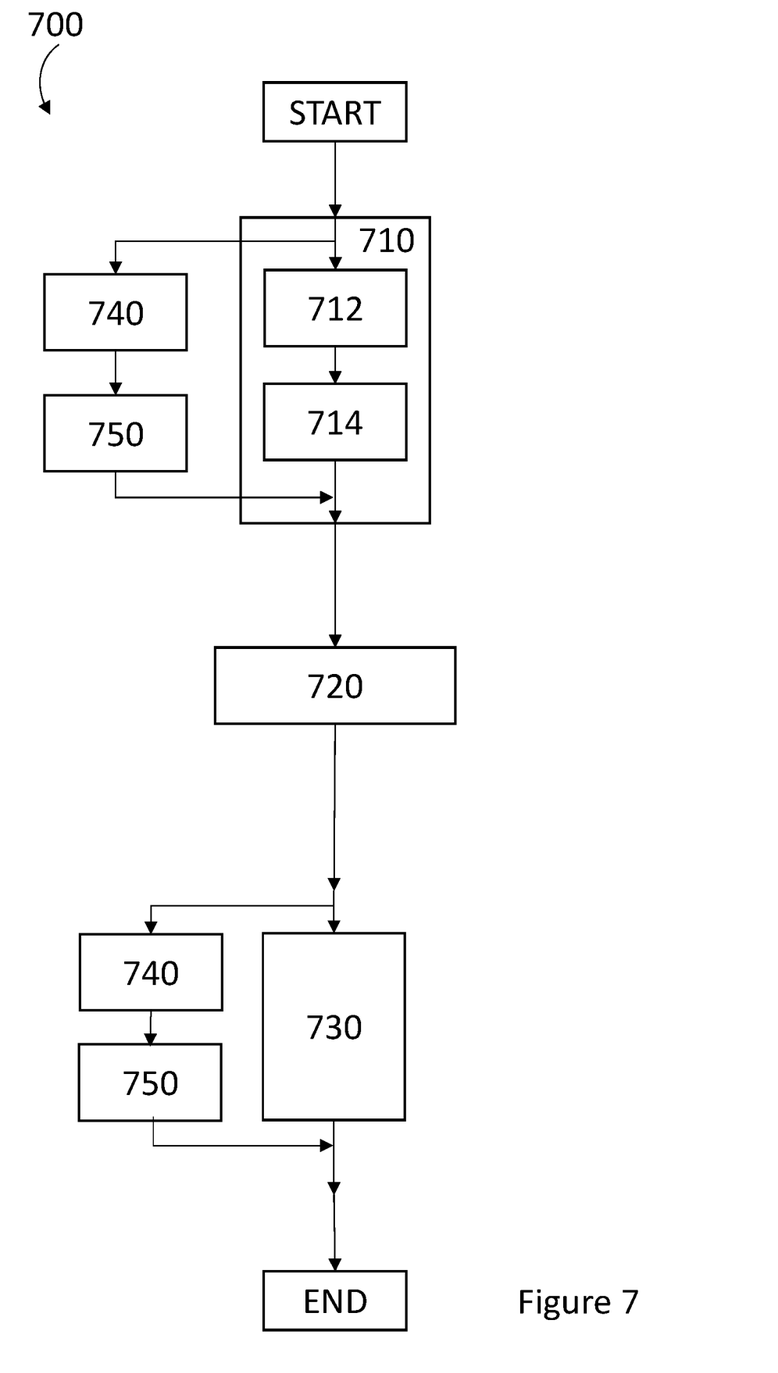
FIG. 7 is a flow chart illustrating a method, according to an example.

FIG. 7 is a flowchart illustrating an example method 700 of supplying material to a three-dimensional printing platform using the apparatus 200 described in relation to FIGS. 1-6f.

At block 710, the rotatable delivery module is rotated in a first direction to a first position. During the rotation at block 710, at block 712 the vane collects a first quantity of material from a deposit of material in a material supply module and thereafter, at block 714, the first quantity of material is supported on the vane. Next, at block 720, the first quantity of material is provided in the first position so that excess material may be removed from the first quantity of material on the vane to leave a dose amount of material on the vane. The first position is a trimming position, such as the trimming position TP, where the vane is arranged relative to a direction of motion of a trimming element such that the excess material may be removed from the first quantity of material by the trimming element to leave the dose amount of material on the vane. At block 730, the rotatable delivery module is rotated further in the first direction from the first position to a second position. The second position is a feed position, such as the feed position FP, where the vane is arranged relative to the direction of motion of the trimming element such that the dose amount of material may be supplied by the trimming element to a three-dimensional platform from the vane.

During the various rotations (block 710, block 730), at least one of the plurality of distribution elements progressively collects amounts of material from the material supply module, depicted at block 740. As a result, at block 750, a second quantity of material is distributed within the material supply module such that the vane provides a uniform dose amount of material. In this way, the preparation of the dose of material and the distribution of material occur concurrently.

Whilst the method 700 describes that the collection and distribution of material by the plurality of distribution elements may occur during the rotation to the first position and the rotation to the second position, in another example, the collection and distribution by the plurality of distribution elements may occur during at least one of the rotations.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. An apparatus for supplying a dose amount of material to an additive manufacturing platform, the apparatus comprising:
    a rotatable delivery module comprising:
        a vane; and
        a distribution portion;
    wherein the vane and the distribution portion abut one another along a rotational axis at an angle α,
    wherein a first longitudinal axis of the vane is parallel to a second longitudinal axis of the distribution portion,
    wherein the distribution portion comprises a plurality of distribution elements, each positioned at a different location along a length of the distribution portion,
    wherein the rotatable delivery module is configured to rotate about the rotational axis to a supply position to enable the dose amount of material to be supplied to the additive manufacturing platform from a material supply module, and
    wherein the plurality of distribution elements of the distribution portion and the vane are configured to uniformly supply and distribute the dose amount of material lengthwise along the material supply module.

2. The apparatus of claim 1, wherein the vane is substantially horizontal in the supply position.

3. The apparatus of claim 2, wherein the dose amount of material is defined by a first position of the vane, wherein in the first position, the vane is angled away from the supply position at a first angle such that the vane and an inner surface of the material supply module define a volume equivalent to the dose amount of material.

4. The apparatus of claim 3 further comprising a trimming element controllable to remove excess material from the vane when the vane is in the first position.

5. The apparatus of claim 4, wherein the distribution portion of the rotatable delivery module comprises a plurality of openings to allow the excess material removed from the vane to return to the material supply module.

6. The apparatus of claim 1, further comprising a trimming element controllable to remove excess material from the vane in a first direction of motion of the trimming element, and controllable to supply the dose amount of material from the vane to the additive manufacturing platform in a second direction of motion of the trimming element.

7. The apparatus of claim 1, wherein each of the plurality of distribution elements has a first portion and a second portion wherein the first portion is arranged to distribute material in a longitudinal direction opposite to the second portion.

8. The apparatus of claim 7, wherein the first portion is a first section of a first helical shape and the second portion is a second section of a second helical shape, wherein the first helical shape has a larger pitch than the second helical shape.

9. The apparatus of claim 8, wherein the first helical shape extends in a first handed direction and the second helical shape extends in a second handed direction, where the first handed direction and the second handed direction are opposite directions.

10. The apparatus of claim 1, wherein the vane extends radially from the rotational axis.

11. The apparatus of claim 10, wherein the distribution portion comprises a first surface, wherein the plurality of distribution elements are arranged on the first surface such that the first surface is arranged behind the vane with respect to a direction of rotation.

12. The apparatus of claim 1, wherein the vane and the distribution portion are formed as a single element.

13. The apparatus of claim 1, wherein the rotatable delivery module is configured to rotate in a clockwise direction.

14. The apparatus of claim 1, further comprising a second rotatable delivery module.

15. An additive manufacturing system comprising a feeder tray arranged to contain a material, a controller, and a rotatable delivery module for supplying the material to an additive manufacturing platform from the feeder tray, the rotatable delivery module comprising:
    a vane; and
    a distribution portion,
    wherein the distribution portion comprises a plurality of distribution elements each positioned at a different location along a length of the distribution portion, wherein the plurality of distribution elements distribute the material lengthwise along a material supply module,
    wherein the vane and the distribution portion abut one another along a rotational axis at an angle α,
    wherein a first longitudinal axis of the vane is parallel to a second longitudinal axis of the distribution portion, and
    wherein the rotatable delivery module is configured to rotate about the rotational axis.

16. The additive manufacturing system of claim 15, wherein:
    each of the plurality of distribution elements comprises a first portion and a second portion, wherein the first portion is arranged to distribute the material in a longitudinal direction opposite to the second portion.

17. The additive manufacturing system of claim 15, further comprising a second rotatable delivery module.

18. The additive manufacturing system of claim 15, wherein the vane extends radially from the rotational axis.

19. The additive manufacturing system of claim 18, wherein the distribution portion comprises a first surface, wherein the plurality of distribution elements are arranged on the first surface such that the first surface is arranged behind the vane with respect to a direction of rotation of the rotatable delivery module.

\* \* \* \* \*